United States Patent
Hsieh et al.

(10) Patent No.: US 11,495,015 B2
(45) Date of Patent: Nov. 8, 2022

(54) OBJECT DETECTION DEVICE AND OBJECT DETECTION METHOD BASED ON NEURAL NETWORK

(71) Applicant: Altek Semiconductor Corp., Hsinchu (TW)

(72) Inventors: Chia-Chun Hsieh, Hsinchu (TW); Wen-Yan Chang, Hsinchu (TW)

(73) Assignee: Altek Semiconductor Corp., Hsinchu (TW)

(*) Notice: Subject to any disclaimer, the term of this patent is extended or adjusted under 35 U.S.C. 154(b) by 287 days.

(21) Appl. No.: 17/030,370

(22) Filed: Sep. 23, 2020

(65) Prior Publication Data

US 2021/0303850 A1 Sep. 30, 2021

(30) Foreign Application Priority Data

Mar. 30, 2020 (TW) ................................. 109110751

(51) Int. Cl.
*G06V 20/10* (2022.01)
*G06N 3/04* (2006.01)
(Continued)

(52) U.S. Cl.
CPC ............ *G06V 20/10* (2022.01); *G06N 3/0454* (2013.01); *G06N 3/063* (2013.01); *G06N 3/08* (2013.01); *G06V 10/454* (2022.01)

(58) Field of Classification Search
CPC ...... G06V 20/10; G06V 10/454; G06V 10/82; G06N 3/0454; G06N 3/063; G06N 3/08; G06N 3/0481
See application file for complete search history.

(56) References Cited

U.S. PATENT DOCUMENTS

| 10,426,442 | B1* | 10/2019 | Schnorr | ............... | A61B 8/5223 |
| 2018/0047272 | A1* | 2/2018 | Chandraker | ....... | G08B 21/0208 |

(Continued)

FOREIGN PATENT DOCUMENTS

| AU | 2019101224 | 1/2020 |
| CN | 107888843 | 4/2018 |

(Continued)

OTHER PUBLICATIONS

Tsang, Sik-Ho, Review: YOLOV2 and YOLO9000—You Only Look Once(Object Detection), Nov. 21, 2018, Towards Data Science, 13 pages (Year: 2018).*
(Continued)

*Primary Examiner* — Lewis G West
(74) *Attorney, Agent, or Firm* — JCIPRNET (57) ABSTRACT

An object detection device and an object detection method based on a neural network are provided. The object detection method includes: receiving an input image and identifying an object in the input image according to an improved YOLO-V2 neural network. The improved YOLO-V2 neural network includes a residual block, a third convolution layer, and a fourth convolution layer. A first input of the residual block is connected to a first convolution layer of the improved YOLO-V2 neural network, and an output of the residual block is connected to a second convolution layer of the improved YOLO-V2 neural network. Here, the residual block is configured to transmit, to the second convolution layer, a summation result corresponding to the first convolution layer. The third convolution layer and the fourth convolution layer are generated by decomposing a convolution layer of an original YOLO-V2 neural network.

9 Claims, 2 Drawing Sheets

(51) Int. Cl.
  *G06N 3/063* (2006.01)
  *G06N 3/08* (2006.01)
  *G06V 10/44* (2022.01)

(56) References Cited

U.S. PATENT DOCUMENTS

| | | | |
|---|---|---|---|
| 2019/0114544 A1* | 4/2019 | Sundaram | G06N 3/0481 |
| 2019/0122113 A1* | 4/2019 | Chen | G06N 3/084 |
| 2019/0130204 A1* | 5/2019 | Li | G06V 30/19173 |
| 2019/0130275 A1* | 5/2019 | Chen | G06N 3/0454 |
| 2019/0147335 A1* | 5/2019 | Wang | G05D 1/0248 706/20 |
| 2019/0187718 A1* | 6/2019 | Zou | G06V 30/194 |
| 2019/0286982 A1* | 9/2019 | Ambai | G06N 3/0454 |
| 2020/0043475 A1 | 2/2020 | Nguyen et al. | |
| 2020/0104706 A1* | 4/2020 | Sandler | G06N 3/082 |
| 2020/0372325 A1* | 11/2020 | Yamamoto | G06F 7/5443 |
| 2021/0406663 A1* | 12/2021 | Timofejevs | G06N 3/0635 |
| 2022/0198243 A1* | 6/2022 | Brothers, III | G06N 3/04 |
| 2022/0261623 A1* | 8/2022 | Sung | G06F 7/5443 |

FOREIGN PATENT DOCUMENTS

| | | |
|---|---|---|
| CN | 109447066 | 3/2019 |
| CN | 110287835 | 9/2019 |
| CN | 110310227 | 10/2019 |

OTHER PUBLICATIONS

Wu Zhao Qi, "Study of Object Detection Based on Infrared Imaging Video", Thesis of Master Degree, University of Electronic Science and Technology of China, Jan. 15, 2020, with English abstract, pp. 1-89.

Ricky Fok et al., "Decoupling the Layers in Residual Networks", International Conference on Learning Representations, Dec. 31, 2018, pp. 1-11.

"Office Action of China Counterpart Application", dated Aug. 26, 2022, p. 1-p. 5.

* cited by examiner

OBJECT DETECTION DEVICE AND OBJECT DETECTION METHOD BASED ON NEURAL NETWORK

CROSS-REFERENCE TO RELATED APPLICATION

This application claims the priority benefit of Taiwan patent application serial no. 109110751, filed on Mar. 30, 2020. The entirety of the above-mentioned patent application is hereby incorporated by reference herein and made a part of this specification.

BACKGROUND

Technical Field

The disclosure relates to an object detection device and an object detection method, and in particular to an object detection device and an object detection method based on a neural network.

Description of Related Art

Detecting and identifying objects by applying a deep learning technology is one of mainstream technologies in an image identification field at present. In order to achieve favorable detection effects, a neural network framework with a large and deep size is usually adopted. The detection result obtained through the aforesaid neural network framework may be accurate; however, demands for computation and memory storage capacities are significantly increased, such that it is difficult to apply the neural network framework to an edge computing device with less computing power.

Accordingly, how to provide a neural network framework characterized by low complexity and high identification accuracy is one of the focuses of people skilled in the art.

SUMMARY

The disclosure provides an object detection device and an object detection method based on a neural network, which may improve a YOLO-V2 neural network to lower computational burden of the YOLO-V2 neural network.

The object detection device based on the neural network in an embodiment of the disclosure includes a processor, a storage medium, and a transceiver. The storage medium stores an improved YOLO-V2 neural network. The processor is coupled to the storage medium and the transceiver. The processor receives an input image through the transceiver and identifies an object in the input image according to the improved YOLO-V2 neural network. The improved YOLO-V2 neural network includes: a residual block, wherein a first input of the residual block is connected to a first convolution layer of the improved YOLO-V2 neural network, an output of the residual block is connected to a second convolution layer of the improved YOLO-V2 neural network, and the residual block is configured to transmit, to the second convolution layer, a summation result corresponding to the first convolution layer; and a third convolution layer including a first number of filters and a fourth convolution layer including a second number of filters, wherein the third convolution layer and the fourth convolution layer are generated by decomposing a convolution layer of an original YOLO-V2 neural network via the processor, the convolution layer includes a third number of filters, and the first number is less than the third number.

In an embodiment of the disclosure, the object detection device further includes a concatenation layer. A second input of the concatenation layer is connected to a pooling layer and a fifth convolution layer of the improved YOLO-V2 neural network.

In an embodiment of the disclosure, the processor adjusts the second number to be less than half the second number.

In an embodiment of the disclosure, the first convolution layer includes an activation function. The first input of the residual block is connected to the activation function of the first convolution layer.

In an embodiment of the disclosure, the activation function is a leaky rectified linear unit.

In an embodiment of the disclosure, the first input of the residual block is further connected to a pooling layer of the improved YOLO-V2 neural network. The residual block is configured to transmit, to the second convolution layer, a summation result of the first convolution layer and the pooling layer.

In an embodiment of the disclosure, the first input of the residual block is further connected to a fifth convolution layer of the improved YOLO-V2 neural network. The residual block is configured to transmit, to the second convolution layer, a summation result of the first convolution layer and the fifth convolution layer.

In an embodiment of the disclosure, the improved YOLO-V2 neural network does not include a reorganization layer.

The object detection method based on the neural network in an embodiment of the disclosure includes: receiving an input image and identifying an object in the input image according to the improved YOLO-V2 neural network. The improved YOLO-V2 neural network includes a residual block, a third convolution layer including a first number of filters, and a fourth convolution layer including a second number of filters. A first input of the residual block is connected to a first convolution layer of the improved YOLO-V2 neural network. An output of the residual block is connected to a second convolution layer of the improved YOLO-V2 neural network. The residual block is configured to transmit, to the second convolution layer, a summation result corresponding to the first convolution layer. The third convolution layer and the fourth convolution layer are generated by decomposing a convolution layer of an original YOLO-V2 neural network, the convolution layer includes a third number of filters, and the first number is less than the third number.

Based on the above, the computational burden of the improved YOLO-V2 neural network provided by one or more embodiments of the disclosure, may be reduced, and identification accuracy of the neural network may be improved by adding the residual block, decomposing the convolution layers, reducing the number of the filters of the convolution layers, removing the reorganization layer, and so on.

Several exemplary embodiments accompanied with figures are described in detail below to further describe the disclosure in details.

BRIEF DESCRIPTION OF THE DRAWINGS

Reference will now be made in detail to the present preferred embodiments of the disclosure, examples of which are illustrated in the accompanying drawings. Wherever

DESCRIPTION OF THE EMBODIMENTS

In order to make the content of the present disclosure more comprehensible, embodiments are described below as examples of implementation of the present disclosure. Wherever possible, the same reference numbers are used in the drawings and the description to refer to the same or like parts, components or steps.

In recent years, the field of object detection makes a great progress due to development of a deep learning technology. The deep learning technology utilized in the field of object detection may include a two-phase method and a one-phase method. Generally, the two-phase method may utilize a region proposal network (RPN) to find the position of an object from an image, and then judge a category of the object with a neural network used for classification. In another aspect, the one-phase method uses a single neural network framework to detect the position of an object and judge a category of the object. The two-phase method can provide good detection accuracy, but computing complexity is also relatively high. Relatively, the one-phase method has relatively low complexity, and requires relatively low computation. Based on these advantages, the one-phase method is preferred by users. The one-phase method includes, for example, a single shot multi Box detector (SSD) or YOLO or other methods. A framework of a traditional YOLO-V2 neural network is shown in Table 1. In Table 1, a field at a higher position represents a lower layer of structure of the YOLO-V2 neural network. For example, a convolution layer 1 represents the first layer (namely the bottommost layer) of structure of the YOLO-V2 neural network, and a convolution layer 22 represents the last layer (namely, the topmost layer) of structure of the YOLO-V2 neural network. In addition, adjacent fields are mutually connected. For example, an output of the convolution layer 1 is connected to an input of a pooling layer 1, and an output of the pooling layer 1 is connected to an input of a convolution layer 2.

TABLE 1

| Name | Type | Number of filters (or convolution kernels) | Size/stride | Bottom | Bottom |
|---|---|---|---|---|---|
| Convolution layer 1 | Convolution kernel + BN + SC + leaky ReLU | 32 | 3 × 3 | | |
| Pooling layer 1 | Maxpooling | | 2 × 2/2 | | |
| Convolution layer 2 | Convolution kernel + BN + SC + leaky ReLU | 64 | 3 × 3 | | |
| Pooling layer 2 | Maxpooling | | 2 × 2/2 | | |
| Convolution layer 3 | Convolution kernel + BN + SC + leaky ReLU | 128 | 3 × 3 | | |
| Convolution layer 4 | Convolution kernel + BN + SC + leaky ReLU | 64 | 1 × 1 | | |
| Convolution layer 5 | Convolution kernel + BN + SC + leaky ReLU | 128 | 3 × 3 | | |
| Pooling layer 5 | Maxpooling | | 2 × 2/2 | | |
| Convolution layer 6 | Convolution kernel + BN + SC + leaky ReLU | 256 | 3 × 3 | | |
| Convolution layer 7 | Convolution kernel + BN + SC + leaky ReLU | 128 | 1 × 1 | | |
| Convolution layer 8 | Convolution kernel + BN + SC + leaky ReLU | 256 | 3 × 3 | | |
| Pooling layer 8 | Maxpooling | | 2 × 2/2 | | |
| Convolution layer 9 | Convolution kernel + BN + SC + leaky ReLU | 512 | 3 × 3 | | |
| Convolution layer 10 | Convolution kernel + BN + SC + leaky ReLU | 256 | 1 × 1 | | |
| Convolution layer 11 | Convolution kernel + BN + SC + leaky ReLU | 512 | 3 × 3 | | |
| Convolution layer 12 | Convolution kernel + BN + SC + leaky ReLU | 256 | 1 × 1 | | |
| Convolution layer 13 | Convolution kernel + BN + SC + leaky ReLU | 512 | 3 × 3 | | |
| Pooling layer 13 | Maxpooling | | 2 × 2/2 | | |
| Convolution layer 14 | Convolution kernel + BN + SC + leaky ReLU | 1024 | 3 × 3 | | |
| Convolution layer 15 | Convolution kernel + BN + SC + leaky ReLU | 512 | 1 × 1 | | |
| Convolution layer 16 | Convolution kernel + BN + SC + leaky ReLU | 1024 | 3 × 3 | | |
| Convolution layer 17 | Convolution kernel + BN + SC + leaky ReLU | 512 | 1 × 1 | | |

TABLE 1-continued

| Name | Type | Number of filters (or convolution kernels) | Size/stride | Bottom | Bottom |
|---|---|---|---|---|---|
| Convolution layer 18 | Convolution kernel + BN + SC + leaky ReLU | 1024 | 3 × 3 | | |
| Convolution layer 19 | Convolution kernel + BN + SC + leaky ReLU | 1024 | 3 × 3 | | |
| Convolution layer 20 | Convolution kernel + BN + SC + leaky ReLU | 1024 | 3 × 3 | | |
| Reorganization layer 13 | Reorganization | 2048 | | SC 13 | |
| Concatenation layer | Concatenation | | | Reorganization layer 13 | SC 20 |
| Convolution layer 21 | Convolution kernel + BN + SC + leaky ReLU | 1024 | 3 × 3 | | |
| Convolution layer 22 | Convolution kernel + BN + SC + leaky ReLU | 425 | 1 × 1 | | |

The convolution layer 1 may include a plurality of convolution kernels, batch normalization (BN), scaling (SC), and an activation function. The activation function is, for example, a leaky rectified linear unit (leaky ReLU). The convolution layer 1 may have 32 convolution kernels, wherein a size of each convolution kernel is, for example, 3×3.

The pooling layer 1 may be configured to perform max-pooling. A size of the pooling layer 1 is, for example, 2×2, and a stride of the pooling layer 1 is, for example, 2.

The convolution layer 2 may include a plurality of convolution kernels, BN, SC and an activation function. The activation function is, for example, a leaky ReLU. The convolution layer 2 may have 64 convolution kernels. A size of each convolution kernel of the convolution layer 2 is, for example, 3×3.

A pooling layer 2 may be configured to perform max-pooling. A size of the pooling layer 2 is, for example, 2×2, and a stride of the pooling layer 2 is, for example, 2.

A convolution layer 3 may include a plurality of convolution kernels, BN, SC and an activation function. The activation function is, for example, a leaky ReLU. The convolution layer 3 may have 128 convolution kernels. A size of each convolution kernel of the convolution layer 3 is, for example, 3×3.

A convolution layer 4 may include a plurality of convolution kernels, BN, SC and an activation function. The activation function is, for example, a leaky ReLU. The convolution layer 4 may have 64 convolution kernels. A size of each convolution kernel of the convolution layer 4 is, for example, 1×1.

A pooling layer 5 may be configured to perform max-pooling. A size of the pooling layer 5 is, for example, 2×2, and a stride of the pooling layer 5 is, for example, 2.

A convolution layer 6 may include a plurality of convolution kernels, BN, SC and an activation function. The activation function is, for example, a leaky ReLU. The convolution layer 6 may have 256 convolution kernels. A size of each convolution kernel of the convolution layer 6 is, for example, 3×3.

A convolution layer 7 may include a plurality of convolution kernels, BN, SC and an activation function. The activation function is, for example, a leaky ReLU. The convolution layer 7 may have 128 convolution kernels. A size of each convolution kernel of the convolution layer 7 is, for example, 1×1.

A convolution layer 8 may include a plurality of convolution kernels, BN, SC and an activation function. The activation function is, for example, a leaky ReLU. The convolution layer 8 may have 256 convolution kernels. A size of each convolution kernel of the convolution layer 8 is, for example, 3×3.

A pooling layer 8 may be configured to perform max-pooling. A size of the pooling layer 8 is, for example, 2×2, and a stride of the pooling layer 8 is, for example, 2.

A convolution layer 9 may include a plurality of convolution kernels, BN, SC and an activation function. The activation function is, for example, a leaky ReLU. The convolution layer 9 may have 512 convolution kernels. A size of each convolution kernel of the convolution layer 9 is, for example, 3×3.

A convolution layer 10 may include a plurality of convolution kernels, BN, SC and an activation function. The activation function is, for example, a leaky ReLU. The convolution layer 10 may have 256 convolution kernels. A size of each convolution kernel of the convolution layer 10 is, for example, 1×1.

A convolution layer 11 may include a plurality of convolution kernels, BN, SC and an activation function. The activation function is, for example, a leaky ReLU. The convolution layer 11 may have 512 convolution kernels. A size of each convolution kernel of the convolution layer 11 is, for example, 3×3.

A convolution layer 12 may include a plurality of convolution kernels, BN, SC and an activation function. The activation function is, for example, a leaky ReLU. The convolution layer 12 may have 256 convolution kernels. A size of each convolution kernel of the convolution layer 12 is, for example, 1×1.

A convolution layer 13 may include a plurality of convolution kernels, BN, SC and an activation function. The activation function is, for example, a leaky ReLU. The convolution layer 13 may have 512 convolution kernels. A size of each convolution kernel of the convolution layer 13 is, for example, 3×3.

A pooling layer 13 may be configured to perform max-pooling. A size of the pooling layer 13 is, for example, 2×2, and a stride of the pooling layer 13 is, for example, 2.

A convolution layer 14 may include a plurality of convolution kernels, BN, SC and an activation function. The activation function is, for example, a leaky ReLU. The convolution layer 14 may have 1024 convolution kernels. A size of each convolution kernel of the convolution layer 14 is, for example, 3×3.

A convolution layer 15 may include a plurality of convolution kernels, BN, SC and an activation function. The activation function is, for example, a leaky ReLU. The convolution layer 15 may have 512 convolution kernels. A size of each convolution kernel of the convolution layer 15 is, for example, 1×1.

A convolution layer 16 may include a plurality of convolution kernels, BN, SC and an activation function. The activation function is, for example, a leaky ReLU. The convolution layer 16 may have 1024 convolution kernels. A size of each convolution kernel of the convolution layer 16 is, for example, 3×3.

A convolution layer 17 may include a plurality of convolution kernels, BN, SC and an activation function. The activation function is, for example, a leaky ReLU. The convolution layer 17 may have 512 convolution kernels. A size of each convolution kernel of the convolution layer 17 is, for example, 1×1.

A convolution layer 18 may include a plurality of convolution kernels, BN, SC and an activation function. The activation function is, for example, a leaky ReLU. The convolution layer 18 may have 1024 convolution kernels. A size of each convolution kernel of the convolution layer 18 is, for example, 3×3.

A convolution layer 19 may include a plurality of convolution kernels, BN, SC and an activation function. The activation function is, for example, a leaky ReLU. The convolution layer 19 may have 1024 convolution kernels. A size of each convolution kernel of the convolution layer 19 is, for example, 3×3.

A convolution layer 20 may include a plurality of convolution kernels, BN, SC and an activation function. The activation function is, for example, a leaky ReLU. The convolution layer 20 may have 1024 convolution kernels. A size of each convolution kernel of the convolution layer 20 is, for example, 3×3.

A bottom of a reorganization layer 13 is connected to the SC 13 in the convolution layer 13. In other words, an input of the reorganization layer 13 is connected to an output of the SC 13. The reorganization layer 13 may be configured to reorganize the output of the SC 13.

A bottom of a concatenation layer is connected to the reorganization layer 13 and the SC 20 in the convolution layer 20. In other words, an input of the concatenation layer is connected to an output of the reorganization layer 13 and an output of the SC 20. The concatenation layer may be configured to concatenate the output of the reorganization layer 13 and the output of the SC 20.

A convolution layer 21 may include a plurality of convolution kernels, BN, SC and an activation function. The activation function is, for example, a leaky ReLU. The convolution layer 21 may have 1024 convolution kernels. A size of each convolution kernel of the convolution layer 21 is, for example, 3×3.

The convolution layer 22 may include a plurality of convolution kernels, BN, SC and an activation function. The activation function is, for example, a leaky ReLU. The convolution layer 22 may have 425 convolution kernels. A size of each convolution kernel of the convolution layer 22 is, for example, 1×1.

Figure 1:
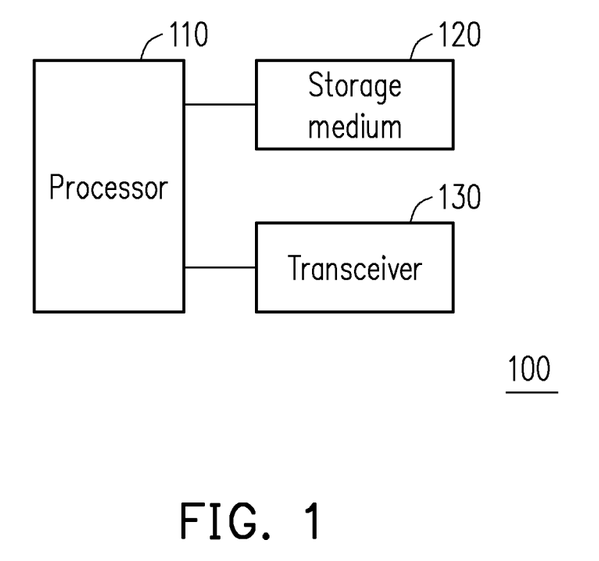
FIG. 1 is a schematic diagram of an object detection device based on a neural network according to an embodiment of the disclosure.

However, in use, the one-phase method still needs to be improved. For example, the framework of the YOLO neural network requires relatively large computation and is relatively low in detection accuracy. In order to lower the computation of the framework of the YOLO neural network and improve the accuracy of the framework of the YOLO neural network, the disclosure provides an object detection device 100 based on a neural network. The object detection device 100 may detect an object by utilizing an improved YOLO-V2 neural network.

FIG. 1 is a schematic diagram of the object detection device 100 based on the neural network according to an embodiment of the disclosure. The object detection device 100 may include a processor 110, a storage medium 120, and a transceiver 130.

The processor 110 is, for example, a central processing unit (CPU), or other programmable general-purpose or special-purpose elements, such as a micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD) and a field programmable gate array (FPGA), or other similar elements or a combination of the above elements. The processor 110 may be coupled to the storage medium 120 and the transceiver 130, and accesses and executes a plurality of modules and various application programs stored in the storage medium 120.

The storage medium 120 is, for example, fixed or mobile elements of any form, such as a random access memory (RAM), a read-only memory (ROM), a flash memory, a hard disk drive (HDD) and a solid state drive (SSD), or similar elements or a combination of the above elements, so that the storage medium 120 is configured to store the plurality of modules or the various application programs capable of being executed by the processor 110. In the present embodiment, the storage medium 120 may store the improved YOLO-V2 neural network configured to detect an object, wherein the improved YOLO-V2 neural network is obtained by improving the YOLO-V2 neural network shown in Table 1.

The transceiver 130 transmits and receives signals in a wireless or wired manner. The transceiver 130 may further execute, for example, low noise amplification, impedance matching, frequency mixing, up or down frequency conversion, filtering, amplification and similar operations. The processor 110 may receive an input image through the transceiver 130 and identify an object in the input image according to the improved YOLO-V2 neural network in the storage medium 120. A framework of the improved YOLO-V2 neural network is shown in Table 2. It should be noted that the improved YOLO-V2 neural network may not include a reorganization layer. Therefore, the improved YOLO-V2 neural network may save computation or memories required to be consumed by the reorganization layer.

TABLE 2

| Name | Type | Number of filters (or convolution kernels) | Size/stride | Bottom | Bottom |
|---|---|---|---|---|---|
| New convolution layer 1 | Convolution kernel + BN + SC + leaky ReLU | 32 | 3 × 3 | | |
| New pooling layer 1 | Maxpooling | | 2 × 2/2 | | |

TABLE 2-continued

| Name | Type | Number of filters (or convolution kernels) | Size/stride | Bottom | Bottom |
|---|---|---|---|---|---|
| New convolution layer 2 | Convolution kernel + BN + SC + leaky ReLU | 64 | 3 × 3 | | |
| New pooling layer 2 | Maxpooling | | 2 × 2/2 | | |
| New convolution layer 3 | Convolution kernel + BN + SC + leaky ReLU | 128 | 3 × 3 | | |
| New convolution layer 4 | Convolution kernel + BN + SC + leaky ReLU | 64 | 1 × 1 | | |
| New convolution layer 5 | Convolution kernel + BN + SC + leaky ReLU | 128 | 3 × 3 | | |
| New pooling layer 5 | Maxpooling | | 2 × 2/2 | | |
| New convolution layer 6 | Convolution kernel + BN + SC + leaky ReLU | 256 | 3 × 3 | | |
| New convolution layer 7 | Convolution kernel + BN + SC + leaky ReLU | 128 | 1 × 1 | | |
| Residual block 7 | Residual computation | | | New pooling layer 5 | Leaky ReLU 7 |
| New convolution layer 8 | Convolution kernel + BN + SC + leaky ReLU | 256 | 3 × 3 | | |
| New pooling layer 8 | Maxpooling | | 2 × 2/2 | | |
| New convolution layer 9 | Convolution kernel + BN + SC + leaky ReLU | 512 | 3 × 3 | | |
| New convolution layer 10 | Convolution kernel + BN + SC + leaky ReLU | 256 | 1 × 1 | | |
| New convolution layer 11 | Convolution kernel + BN + SC + leaky ReLU | 512 | 3 × 3 | | |
| New convolution layer 12 | Convolution kernel + BN + SC + leaky ReLU | 256 | 1 × 1 | | |
| Residual block 12 | Residual computation | | | Leaky ReLU 10 | Leaky ReLU 12 |
| New convolution layer 13 | Convolution kernel + BN + SC + leaky ReLU | 512 | 3 × 3 | | |
| New pooling layer 13 | Maxpooling | | 2 × 2/2 | | |
| New convolution layer 14_lower layer | Convolution kernel | 64 | 3 × 3 | | |
| New convolution layer 14_upper layer | Convolution kernel + BN + SC + leaky ReLU | 1024 | 1 × 1 | | |
| New convolution layer 15 | Convolution kernel + BN + SC + leaky ReLU | 512 | 1 × 1 | | |
| Residual block 15 | Residual computation | | | New pooling layer 13 | Leaky ReLU 15 |
| New convolution layer 16_lower layer | Convolution kernel | 64 | 3 × 3 | | |
| New convolution layer 16_upper layer | Convolution kernel + BN + SC + leaky ReLU | 1024 | 1 × 1 | | |

TABLE 2-continued

| Name | Type | Number of filters (or convolution kernels) | Size/stride | Bottom | Bottom |
|---|---|---|---|---|---|
| New convolution layer 17 | Convolution kernel + BN + SC + leaky ReLU | 512 | 1 × 1 | | |
| New convolution layer 18_lower layer | Convolution kernel | 64 | 3 × 3 | | |
| New convolution layer 18_upper layer | Convolution kernel + BN + SC + leaky ReLU | 1024 | 1 × 1 | | |
| New convolution layer 19_lower layer | Convolution kernel | 64 | 3 × 3 | | |
| New convolution layer 19_upper layer | Convolution kernel + BN + SC + leaky ReLU | 1024 | 1 × 1 | | |
| New convolution layer 20_lower layer | Convolution kernel | 64 | 3 × 3 | | |
| New convolution layer 20_upper layer | Convolution kernel + BN + SC + leaky ReLU | 1024 | 1 × 1 | | |
| New concatenation layer | Concatenation | | | New pooling layer 13 | Leaky ReLU 20 |
| New convolution layer 21_lower layer | Convolution kernel | 64 | 3 × 3 | | |
| New convolution layer 21_upper layer | Convolution kernel + BN + SC + leaky ReLU | 1024 | 1 × 1 | | |
| New convolution layer 22 | Convolution kernel + BN + SC + leaky ReLU | 40 | 1 × 1 | | |

A new convolution layer 1 may include a plurality of convolution kernels, BN, SC and an activation function. The activation function is, for example, a leaky ReLU. The new convolution layer 1 may have 32 convolution kernels. A size of each convolution kernel of the new convolution layer 1 is, for example, 3×3. In an embodiment, the new convolution layer 1 shown in Table 2 may be the same as the convolution layer 1 shown in Table 1.

A new pooling layer 1 may be configured to perform maxpooling. A size of the new pooling layer 1 is, for example, 2×2, and a stride of the new pooling layer 1 is, for example, 2. In an embodiment, the new pooling layer 1 shown in Table 2 may be the same as the pooling layer 1 shown in Table 1.

A new convolution layer 2 may include a plurality of convolution kernels, BN, SC and an activation function. The activation function is, for example, a leaky ReLU. The new convolution layer 2 may have 64 convolution kernels. A size of each convolution kernel of the new convolution layer 2 is, for example, 3×3. In an embodiment, the new convolution layer 2 shown in Table 2 may be the same as the convolution layer 2 shown in Table 1.

A new pooling layer 2 may be configured to perform maxpooling. A size of the new pooling layer 2 is, for example, 2×2, and a stride of the new pooling layer 2 is, for example, 2. In an embodiment, the new pooling layer 2 shown in Table 2 may be the same as the pooling layer 2 shown in Table 1.

A new convolution layer 3 may include a plurality of convolution kernels, BN, SC and an activation function. The activation function is, for example, a leaky ReLU. The new convolution layer 3 may have 128 convolution kernels. A size of each convolution kernel of the new convolution layer 3 is, for example, 3×3. In an embodiment, the new convolution layer 3 shown in Table 2 may be the same as the convolution layer 3 shown in Table 1.

A new convolution layer 4 may include a plurality of convolution kernels, BN, SC and an activation function. The activation function is, for example, a leaky ReLU. The new convolution layer 4 may have 64 convolution kernels. A size of each convolution kernel of the new convolution layer 4 is, for example, 1×1. In an embodiment, the new convolution layer 4 shown in Table 2 may be the same as the convolution layer 4 shown in Table 1.

A new convolution layer 5 may include a plurality of convolution kernels, BN, SC and an activation function. The activation function is, for example, a leaky ReLU. The new convolution layer 5 may have 128 convolution kernels. A size of each convolution kernel of the new convolution layer 5 is, for example, 3×3. In an embodiment, the new convolution layer 5 shown in Table 2 may be the same as the convolution layer 5 shown in Table 1.

A new pooling layer 5 may be configured to perform maxpooling. A size of the new pooling layer 5 is, for example, 2×2, and a stride of the new pooling layer 5 is, for example, 2. In an embodiment, the new pooling layer 5 shown in Table 2 may be the same as the pooling layer 5 shown in Table 1.

A new convolution layer 6 may include a plurality of convolution kernels, BN, SC and an activation function. The activation function is, for example, a leaky ReLU. The new convolution layer 6 may have 256 convolution kernels. A size of each convolution kernel of the new convolution layer 6 is, for example, 3×3. In an embodiment, the new convolution layer 6 shown in Table 2 may be the same as the convolution layer 6 shown in Table 1.

A new convolution layer 7 may include a plurality of convolution kernels, BN, SC and an activation function. The activation function is, for example, a leaky ReLU. The new convolution layer 7 may have 128 convolution kernels. A size of each convolution kernel of the new convolution layer 7 is, for example, 1×1. In an embodiment, the new convolution layer 7 shown in Table 2 may be the same as the convolution layer 7 shown in Table 1.

A bottom of a residual block 7 is connected to the new pooling layer 5 and the leaky ReLU 7 in the new convolution layer 7. In other words, an input of the residual block 7 is connected to an output of the new pooling layer 5 and an output of the leaky ReLU 7 of the new convolution layer 7. The residual block 7 may be configured to summate the output of the new pooling layer 5 and the output of the leaky ReLU 7 to generate a summation result. The residual block 7 may further transmit the summation result to a new convolution layer 8. By adding the residual block into the framework of the YOLO-V2 neural network, the accuracy of object detection can be effectively improved.

The new convolution layer 8 may include a plurality of convolution kernels, BN, SC and an activation function. The activation function is, for example, a leaky ReLU. The new convolution layer 8 may have 256 convolution kernels. A size of each convolution kernel of the new convolution layer 8 is, for example, 3×3. In an embodiment, the new convolution layer 8 shown in Table 2 may be the same as the convolution layer 8 shown in Table 1.

A new pooling layer 8 may be configured to perform maxpooling. A size of the new pooling layer 8 is, for example, 2×2, and a stride of the new pooling layer 8 is, for example, 2. In an embodiment, the new pooling layer 8 shown in Table 2 may be the same as the pooling layer 8 shown in Table 1.

A new convolution layer 9 may include a plurality of convolution kernels, BN, SC and an activation function. The activation function is, for example, a leaky ReLU. The new convolution layer 9 may have 512 convolution kernels. A size of each convolution kernel of the new convolution layer 9 is, for example, 3×3. In an embodiment, the new convolution layer 9 shown in Table 2 may be the same as the convolution layer 9 shown in Table 1.

A new convolution layer 10 may include a plurality of convolution kernels, BN, SC and an activation function. The activation function is, for example, a leaky ReLU. The new convolution layer 10 may have 256 convolution kernels. A size of each convolution kernel of the new convolution layer 10 is, for example, 1×1. In an embodiment, the new convolution layer 10 shown in Table 2 may be the same as the convolution layer 10 shown in Table 1.

A new convolution layer 11 may include a plurality of convolution kernels, BN, SC and an activation function. The activation function is, for example, a leaky ReLU. The new convolution layer 11 may have 512 convolution kernels. A size of each convolution kernel of the new convolution layer 11 is, for example, 3×3. In an embodiment, the new convolution layer 11 shown in Table 2 may be the same as the convolution layer 11 shown in Table 1.

A new convolution layer 12 may include a plurality of convolution kernels, BN, SC and an activation function. The activation function is, for example, a leaky ReLU. The new convolution layer 12 may have 256 convolution kernels. A size of each convolution kernel of the new convolution layer 12 is, for example, 1×1. In an embodiment, the new convolution layer 12 shown in Table 2 may be the same as the convolution layer 12 shown in Table 1.

A bottom of a residual block 12 is connected to the leaky ReLU 10 in the new convolution layer 10 and the leaky ReLU 12 in the new convolution layer 12. In other words, an input of the residual block 12 is connected to an output of the leaky ReLU 10 and an output of the leaky ReLU 12. The residual block 12 may be configured to summate the output of the leaky ReLU 10 and the output of the leaky ReLU 12 to generate a summation result. The residual block 12 may further transmit the summation result to a new convolution layer 13.

The new convolution layer 13 may include a plurality of convolution kernels, BN, SC and an activation function. The activation function is, for example, a leaky ReLU. The new convolution layer 13 may have 512 convolution kernels. A size of each convolution kernel of the new convolution layer 13 is, for example, 3×3. In an embodiment, the new convolution layer 13 shown in Table 2 may be the same as the convolution layer 13 shown in Table 1.

A new pooling layer 13 may be configured to perform maxpooling. A size of the new pooling layer 13 is, for example, 2×2, and a stride of the new pooling layer 13 is, for example, 2. In an embodiment, the new pooling layer 13 shown in Table 2 may be the same as the pooling layer 13 shown in Table 1.

A new convolution layer 14_lower layer and a new convolution layer 14_upper layer are generated by decomposing the convolution layer 14 shown in Table 1 by the processor 110. The number of convolution kernels of the new convolution layer 14_lower layer may be less than the number of the convolution kernels of the convolution layer 14. For example, the new convolution layer 14_lower layer may have 64 convolution kernels. A size of each convolution kernel of the new convolution layer 14_lower layer is, for example, 3×3. The new convolution layer 14_upper layer may have 2048 convolution kernels. A size of each convolution kernel of the new convolution layer 14_upper layer is, for example, 1×1. In an embodiment, the processor 110 may adjust the number of the convolution kernels of the new convolution layer 14_upper layer to be half (namely 1024) the current convolution kernel number (namely 2048) of the new convolution layer 14_upper layer or to be less than half the current convolution kernel number, so that the computation required to be consumed by the new convolution layer 14_upper layer is lowered.

An original YOLO-V2 neural network model needs to occupy memories of 260 million bytes approximately. It is a large burden for an edge computing device with less computing power. In order to shrink the model, the processor 110 may decompose a convolution layer (such as the 3×3 convolution layer 14) of the original YOLO-V2 neural network model into two new convolution layers, which are respectively a new convolution layer_lower layer (such as the 3×3 new convolution layer 14 lower layer) and a new convolution layer_upper layer (such as the 1×1 new convolution layer 14 upper layer). The number of convolution kernels of the new convolution layer_lower layer is far less than the number of convolution kernels of the convolution layer. Therefore, the number of parameters can be obviously reduced, and a computation speed is increased. The processor 110 may decompose the convolution layers (such as the convolution layers 14, 16, 18 and 19-21 shown in Table 1) located on upper layers of the original YOLO-V2 neural network model so as to generate the new convolution layer_lower layers and the new convolution layer_upper layers of the improved YOLO-V2 neural network.

A new convolution layer 15 may include a plurality of convolution kernels, BN, SC and an activation function. The activation function is, for example, a leaky ReLU. The new convolution layer 15 may have 512 convolution kernels. A size of each convolution kernel of the new convolution layer 15 is, for example, 1×1. In an embodiment, the new convolution layer 15 shown in Table 2 may be the same as the convolution layer 15 shown in Table 1.

A bottom of a residual block 15 is connected to the new pooling layer 13 and the leaky ReLU 15 in the new convolution layer 15. In other words, an input of the residual block 15 is connected to an output of the new pooling layer 13 and an output of the leaky ReLU 15. The residual block 15 may be configured to summate the output of the new pooling layer 13 and the output of the leaky ReLU 15 to generate a summation result. The residual block 15 may further transmit the summation result to a new convolution layer 16_lower layer.

The new convolution layer 16_lower layer and a new convolution layer 16 upper layer are generated by decomposing the convolution layer 16 shown in Table 1 by the processor 110. The number of convolution kernels of the new convolution layer 16_lower layer may be less than the number of the convolution kernels of the convolution layer 16. For example, the new convolution layer 16_lower layer may have 64 convolution kernels. A size of each convolution kernel of the new convolution layer 16_lower layer is, for example, 3×3. The new convolution layer 16_upper layer may have 2048 convolution kernels. A size of each convolution kernel of the new convolution layer 16_upper layer is, for example, 1×1. In an embodiment, the processor 110 may adjust the number of the convolution kernels of the new convolution layer 16_upper layer to be half (namely 1024) the current convolution kernel number (namely 2048) of the new convolution layer 16_upper layer or to be less than half the current convolution kernel number, so that the computation required to be consumed by the new convolution layer 16_upper layer is lowered.

A new convolution layer 17 may include a plurality of convolution kernels, BN, SC and an activation function. The activation function is, for example, a leaky ReLU. The new convolution layer 17 may have 512 convolution kernels. A size of each convolution kernel of the new convolution layer 17 is, for example, 1×1. In an embodiment, the new convolution layer 17 shown in Table 2 may be the same as the convolution layer 17 shown in Table 1.

A new convolution layer 18_lower layer and a new convolution layer 18_upper layer are generated by decomposing the convolution layer 18 shown in Table 1 by the processor 110. The number of convolution kernels of the new convolution layer 18_lower layer may be less than the number of the convolution kernels of the convolution layer 18. For example, the new convolution layer 18_lower layer may have 64 convolution kernels. A size of each convolution kernel of the new convolution layer 18_lower layer is, for example, 3×3. The new convolution layer 18_upper layer may have 2048 convolution kernels. A size of each convolution kernel of the new convolution layer 18_upper layer is, for example, 1×1. In an embodiment, the processor 110 may adjust the number of the convolution kernels of the new convolution layer 18_upper layer to be half (namely 1024) the current convolution kernel number (namely 2048) of the new convolution layer 18_upper layer or to be less than half the current convolution kernel number, so that the computation required to be consumed by the new convolution layer 18_upper layer is lowered.

A new convolution layer 19_lower layer and a new convolution layer 19_upper layer are generated by decomposing the convolution layer 19 shown in Table 1 by the processor 110. The number of convolution kernels of the new convolution layer 19_lower layer may be less than the number of the convolution kernels of the convolution layer 19. For example, the new convolution layer 19_lower layer may have 64 convolution kernels. A size of each convolution kernel of the new convolution layer 19_lower layer is, for example, 3×3. The new convolution layer 19_upper layer may have 2048 convolution kernels. A size of each convolution kernel of the new convolution layer 19_upper layer is, for example, 1×1. In an embodiment, the processor 110 may adjust the number of the convolution kernels of the new convolution layer 19_upper layer to be half (namely 1024) the current convolution kernel number (namely 2048) of the new convolution layer 19_upper layer or to be less than half the current convolution kernel number, so that the computation required to be consumed by the new convolution layer 19_upper layer is lowered.

A new convolution layer 20_lower layer and a new convolution layer 20 upper layer are generated by decomposing the convolution layer 20 shown in Table 1 by the processor 110. The number of convolution kernels of the new convolution layer 20_lower layer may be less than the number of the convolution kernels of the convolution layer 20. For example, the new convolution layer 20_lower layer may have 64 convolution kernels. A size of each convolution kernel of the new convolution layer 20_lower layer is, for example, 3×3. The new convolution layer 20_upper layer may have 2048 convolution kernels. A size of each convolution kernel of the new convolution layer 20_upper layer is, for example, 1×1. In an embodiment, the processor 110 may adjust the number of the convolution kernels of the new convolution layer 20_upper layer to be half (namely 1024) the current convolution kernel number (namely 2048) of the new convolution layer 20_upper layer or to be less than half o the current convolution kernel number, so that the computation required to be consumed by the new convolution layer 20_upper layer is lowered.

A bottom of a new concatenation layer is connected to the new pooling layer 13 and the leaky ReLU 20 in the convolution layer 20. In other words, an input of the new concatenation layer is connected to an output of the new pooling layer 13 and an output of the leaky ReLU 20. The new concatenation layer may be configured to concatenate the output of the new pooling layer 13 and the output of the leaky ReLU 20.

A new convolution layer 21_lower layer and a new convolution layer 21_upper layer are generated by decomposing the convolution layer 21 shown in Table 1 by the processor 110. The number of convolution kernels of the new convolution layer 21_lower layer may be less than the number of the convolution kernels of the convolution layer 21. For example, the new convolution layer 21_lower layer may have 64 convolution kernels. A size of each convolution kernel of the new convolution layer 21_lower layer is, for example, 3×3. The new convolution layer 21_upper layer may have 2048 convolution kernels. A size of each convolution kernel of the new convolution layer 21_upper layer is, for example, 1×1. In an embodiment, the processor 110 may adjust the number of the convolution kernels of the new convolution layer 21_upper layer to be half (namely 1024) the current convolution kernel number (namely 2048) of the new convolution layer 21_upper layer or to be less than half the current convolution kernel number, so that the computation required to be consumed by the new convolution layer 21 upper layer is lowered.

A new convolution layer 22 may include a plurality of convolution kernels, BN, SC and an activation function. The activation function is, for example, a leaky ReLU. The new convolution layer 22 may have 425 convolution kernels. A size of each convolution kernel of the new convolution layer 22 is, for example, 1×1. In an embodiment, the new convolution layer 22 shown in Table 2 may be the same as the convolution layer 22 shown in Table 1.

Figure 2:
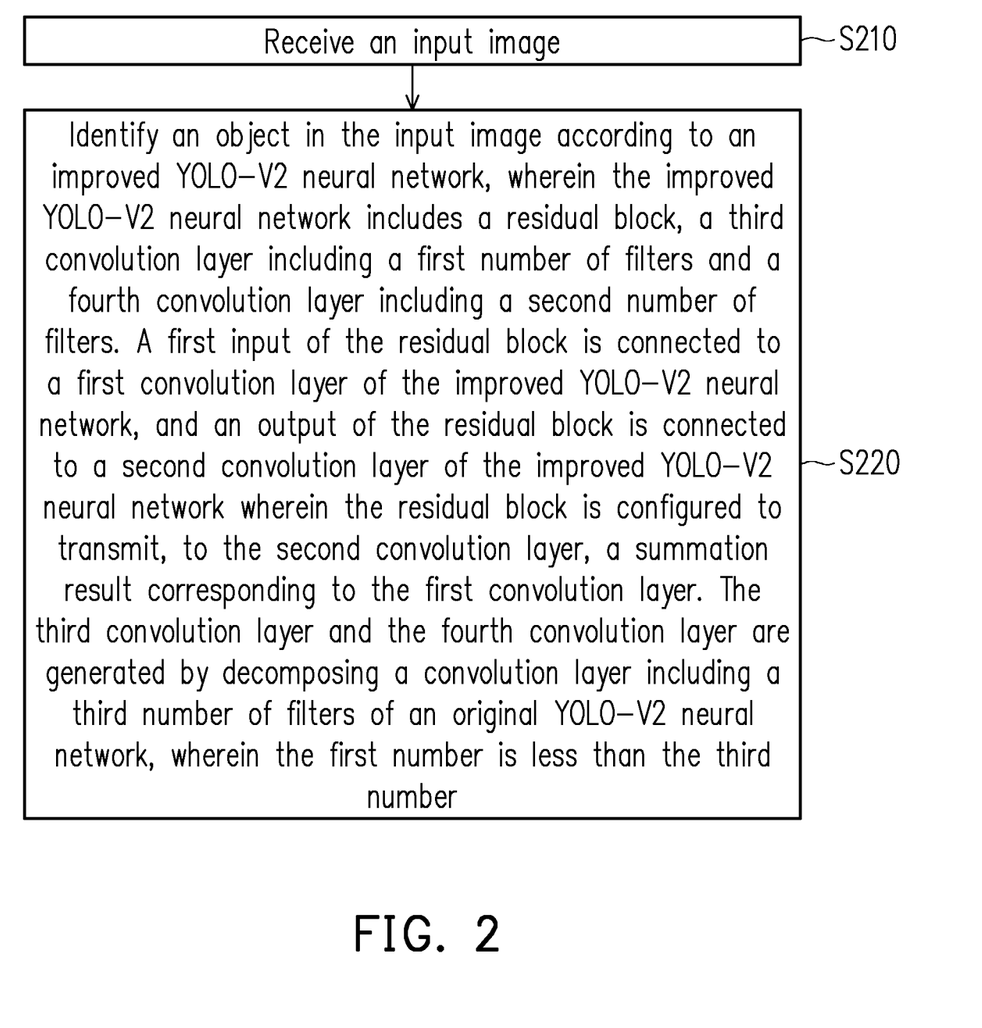
FIG. 2 is a flowchart of an object detection method based on a neural network according to an embodiment of the disclosure.

FIG. 2 is a flowchart of an object detection method based on a neural network according to an embodiment of the disclosure. The object detection method may be implemented by the object detection device 100 shown in FIG. 1. In step S210, an input image is received. In step S220, an object in the input image is identified according to an improved YOLO-V2 neural network. The improved YOLO-V2 neural network includes a residual block, a third convolution layer including a first number of filters, and a fourth convolution layer including a second number of filters. A first input of the residual block is connected to a first convolution layer of the improved YOLO-V2 neural network. An output of the residual block is connected to a second convolution layer of the improved YOLO-V2 neural network. The residual block is configured to transmit, to the second convolution layer, a summation result corresponding to the first convolution layer. The third convolution layer and the fourth convolution layer are generated by decomposing a convolution layer of an original YOLO-V2 neural network, the convolution layer includes a third number of filters, and the first number is less than the third number.

Based on the above, according to the improved YOLO-V2 neural network provided by the disclosure, the residual block can be added to the original YOLO-V2 neural network to improve the accuracy of identification. In addition, the improved YOLO-V2 neural network further includes the two convolution layers generated by decomposing a single convolution layer of the original YOLO-V2 neural network. Compared with the single convolution layer of the original YOLO-V2 neural network, the number of the filters in the two convolution layers can be greatly reduced. Therefore, the computation required by the improved YOLO-V2 neural network will be significantly lowered. Moreover, in the improved YOLO-V2 neural network, the reorganization layer of the original YOLO-V2 neural network is removed, so that the computational burden of the neural network is reduced.

What is claimed is:

1. An object detection device based on a neural network, comprising:
    a transceiver;
    a storage medium, storing an improved YOLO-V2 neural network; and
    a processor, coupled to the storage medium and the transceiver, wherein the processor receives an input image through the transceiver and identifies an object in the input image according to the improved YOLO-V2 neural network, and the improved YOLO-V2 neural network comprises:
        a residual block, wherein a first input of the residual block is connected to a first convolution layer of the improved YOLO-V2 neural network, an output of the residual block is connected to a second convolution layer of the improved YOLO-V2 neural network, and the residual block is configured to transmit, to the second convolution layer, a summation result corresponding to the first convolution layer; and
        a third convolution layer and a fourth convolution layer, the third convolution layer comprising a first number of filters, the fourth convolution layer comprising a second number of filters, wherein the third convolution layer and the fourth convolution layer are generated by decomposing a convolution layer of an original YOLO-V2 neural network by the processor, the convolution layer comprises a third number of filters, and the first number is less than the third number.

2. The object detection device according to claim 1, further comprising:
    a concatenation layer, wherein a second input of the concatenation layer is connected to a pooling layer and a fifth convolution layer of the improved YOLO-V2 neural network.

3. The object detection device according to claim 1, wherein the processor adjusts the second number to be less than half the second number.

4. The object detection device according to claim 1, wherein the first convolution layer comprises an activation function, and the first input of the residual block is connected to the activation function of the first convolution layer.

5. The object detection device according to claim 4, wherein the activation function is a leaky rectified linear unit.

6. The object detection device according to claim 1, wherein the first input of the residual block is further connected to a pooling layer of the improved YOLO-V2 neural network, and the residual block is configured to transmit, to the second convolution layer, a summation result of the first convolution layer and the pooling layer.

7. The object detection device according to claim 1, wherein the first input of the residual block is further connected to a fifth convolution layer of the improved YOLO-V2 neural network, and the residual block is configured to transmit, to the second convolution layer, a summation result of the first convolution layer and the fifth convolution layer.

8. The object detection device according to claim 1, wherein the improved YOLO-V2 neural network does not comprise a reorganization layer.

9. An object detection method based on a neural network, comprising:
    receiving an input image; and
    identifying an object in the input image according to an improved YOLO-V2 neural network, wherein the improved YOLO-V2 neural network comprises:
        a residual block, wherein a first input of the residual block is connected to a first convolution layer of the improved YOLO-V2 neural network, an output of the residual block is connected to a second convolution layer of the improved YOLO-V2 neural network, and the residual block is configured to transmit, to the second convolution layer, a summation result corresponding to the first convolution layer; and
        a third convolution layer and a fourth convolution layer, the third convolution layer comprising a first number of filters, the fourth convolution layer comprising a second number of filters, wherein the third convolution layer and the fourth convolution layer are generated by decomposing a convolution layer of an original YOLO-V2 neural network, the convolution layer comprises a third number of filters, and the first number is less than the third number.

* * * * *